US012626308B2

(12) United States Patent
Cichy et al.

(10) Patent No.: US 12,626,308 B2
(45) Date of Patent: *May 12, 2026

(54) PROCESS AND SYSTEM FOR THE MANAGEMENT, STORAGE AND AUTOMATION OF HEALTH CARE INFORMATION AND APPLICATION PROGRAM INTERFACE THEREFOR

(71) Applicant: Monarch Specialty Group, Inc., Chicago, IL (US)

(72) Inventors: Stephen Barrett Cichy, Chicago, IL (US); Markus Daniel Bockle, Chicago, IL (US); Courtney Brooke Jackson, Chicago, IL (US)

(73) Assignee: Monarch Specialty Group, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/914,482

(22) Filed: Oct. 14, 2024

(65) Prior Publication Data

US 2025/0078167 A1     Mar. 6, 2025

Related U.S. Application Data

(63) Continuation of application No. 18/646,511, filed on Apr. 25, 2024, now Pat. No. 12,136,128, which is a continuation of application No. 17/399,178, filed on Aug. 11, 2021, now abandoned.

(60) Provisional application No. 63/208,861, filed on Jun. 9, 2021.

(51) Int. Cl.
*G06Q 40/08* (2012.01)
*G06Q 30/0207* (2023.01)

(52) U.S. Cl.
CPC ......... *G06Q 40/08* (2013.01); *G06Q 30/0207* (2013.01)

(58) Field of Classification Search
None
See application file for complete search history.

(56) References Cited

U.S. PATENT DOCUMENTS

| | | | |
|---|---|---|---|
| 7,111,780 B2 | 9/2006 | Broussard | |
| 7,840,424 B2 | 11/2010 | Wiley, II | |
| 7,856,364 B1 | 12/2010 | Wiley, II | |
| 7,979,285 B2 | 7/2011 | Wiley | |
| 8,032,397 B2 * | 10/2011 | Lawless ................ | G16H 40/67 |
| | | | 705/2 |
| 8,036,913 B1 | 10/2011 | Pinsonneault | |
| 8,036,914 B1 | 10/2011 | Pinsonneault | |
| 8,036,918 B1 | 10/2011 | Pinsonneault | |
| 8,050,943 B1 | 11/2011 | Wiley, II | |

(Continued)

*Primary Examiner* — Christopher Bridges
(74) *Attorney, Agent, or Firm* — Dentons US LLP

(57) ABSTRACT

This disclosure relates to technologies for optimizing of computer systems where the generation and transfer of digital information between a plurality of software, stored in a plurality of databases must be coordinated. More precisely, in the field of health care, the use of software patches in conjunction with highjack of unique protocol features using, for example an Application Programming Interface (API) or similar software modification to leverage transmission segments of a protocol to generate information and automated responses in a second software for use in a first as part of a system, used in a process and method of use thereof.

20 Claims, 13 Drawing Sheets

(56)　　　　　References Cited

U.S. PATENT DOCUMENTS

| | | | | |
|---|---|---|---|---|
| 8,060,379 | B1 | 11/2011 | Pinsonneault | |
| 8,190,453 | B2 | 5/2012 | Rowe, III | |
| 8,392,214 | B1 | 3/2013 | Pinsonneault | |
| 8,392,219 | B1* | 3/2013 | Pinsonneault | G06Q 40/08 |
| | | | | 715/733 |
| 8,589,181 | B2 | 11/2013 | Berzansky | |
| 8,670,999 | B2 | 3/2014 | Berzansky | |
| 8,781,854 | B1 | 7/2014 | Harris, Sr. | |
| 8,924,231 | B2* | 12/2014 | Hoffman | G06Q 10/10 |
| | | | | 705/2 |
| 9,076,186 | B2* | 7/2015 | Burkett | G06Q 30/02 |
| 9,231,935 | B1* | 1/2016 | Bridge | H04L 63/08 |
| 9,904,965 | B2 | 2/2018 | White | |
| 10,157,262 | B1 | 12/2018 | Pinsonneault | |
| 10,192,193 | B1 | 1/2019 | Glass | |
| 10,248,641 | B2 | 4/2019 | Wagh | |
| 10,417,380 | B1 | 9/2019 | Kaye | |
| 10,489,552 | B2 | 11/2019 | Pinsonneault | |
| 10,496,793 | B1* | 12/2019 | Lawrence | G16H 40/20 |
| 10,565,656 | B1 | 2/2020 | Pinsonneault | |
| 10,616,146 | B1 | 4/2020 | Hopkins | |
| 2004/0153336 | A1* | 8/2004 | Virdee | G06Q 10/10 |
| | | | | 705/2 |
| 2007/0276697 | A1 | 11/2007 | Wiley | |
| 2010/0217622 | A1* | 8/2010 | Brown | G06Q 40/08 |
| | | | | 705/2 |
| 2011/0145011 | A1* | 6/2011 | Shell | G06Q 10/10 |
| | | | | 705/2 |
| 2013/0054261 | A1 | 2/2013 | Dufour | |
| 2013/0211856 | A1 | 8/2013 | Pribyl | |
| 2013/0226608 | A1 | 8/2013 | Di Lascia | |
| 2015/0228030 | A1 | 8/2015 | Scantland | |
| 2015/0234991 | A1* | 8/2015 | Pinsonneault | G06Q 40/08 |
| | | | | 705/3 |

* cited by examiner

Patient Information

| | |
|---|---|
| Last Name: | Doe |
| First Name: | Jane |
| Family: | Head of Household |
| Street: | 12345 Streeter St. |
| Suite: | |

| | | | |
|---|---|---|---|
| City: | Chicago | State: | IL |
| Zip Code: | 60654 | Country: | |
| Home: | (312)456-7890 | | Add Alt |
| Mobile: | (312)456-7890 | | Text Okay |
| Birth Date: | 7/4/1954 | Gender: | Female |
| S.S. # | | Language: | English |

Attachment

Add Notes   Add Docs   ICD Codes

Insurance

| Insurance | | Bin | PCN |
|---|---|---|---|
| Coverage | ID | Group | |
| 001234:ADV: BENEFITS | | 001234 | ABCDEFG |
| Primary | 001234 | 789123 | |

133

134

| Add | Edit | Insurance | Copy | Delete |
|---|---|---|---|---|

FIG. 7

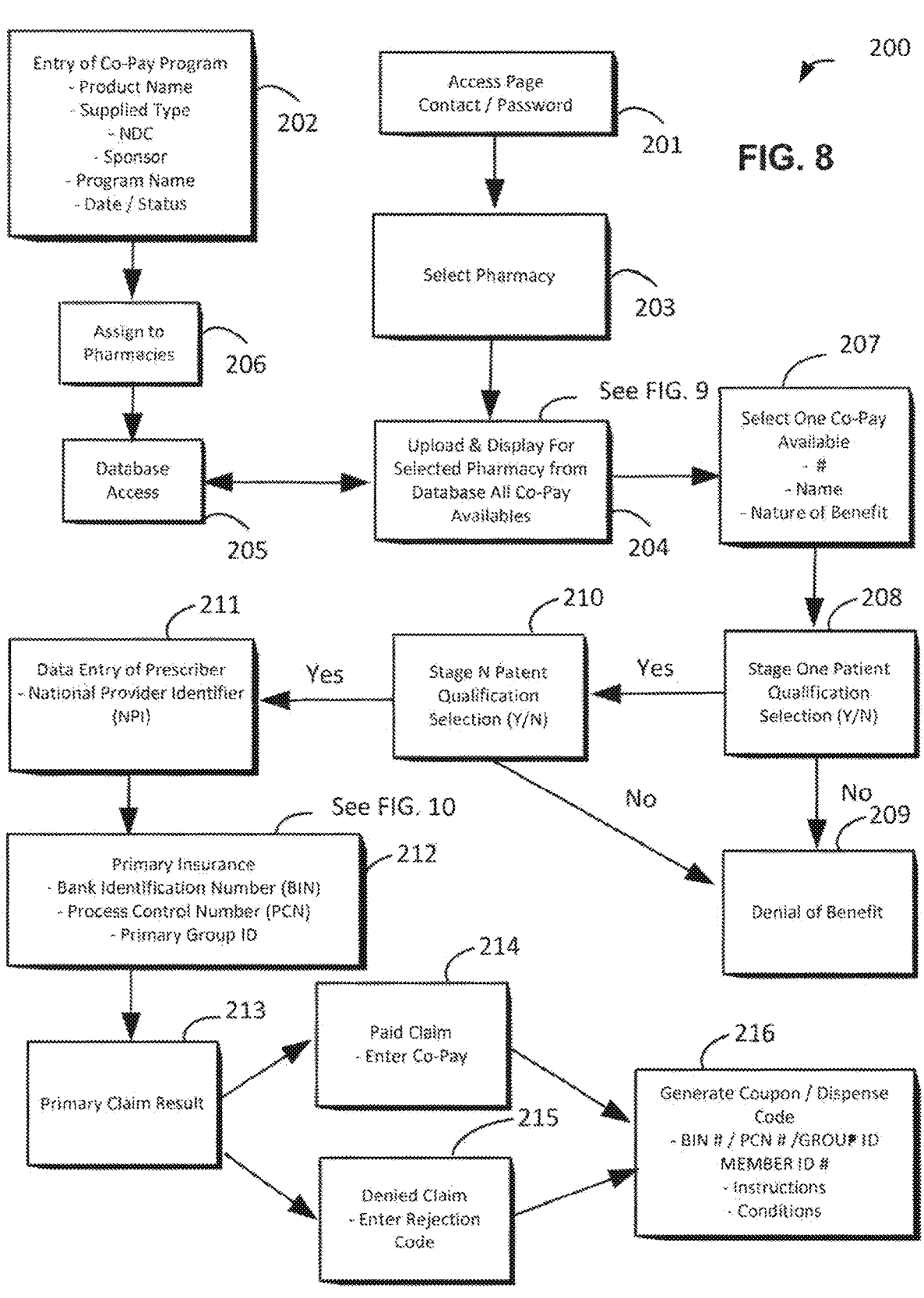

FIG. 8

Access Page
Contact / Password
201

Entry of Co-Pay Program
- Product Name
- Supplied Type
- NDC
- Sponsor
- Program Name
- Date / Status
202

200

Select Pharmacy
203

Assign to Pharmacies
206

Database Access
205

Upload & Display For Selected Pharmacy from Database All Co-Pay Availables
204

See FIG. 9

Select One Co-Pay Available
- #
- Name
- Nature of Benefit
207

Data Entry of Prescriber
- National Provider Identifier (NPI)
211

Stage N Patent Qualification Selection (Y/N)
210

Stage One Patient Qualification Selection (Y/N)
208

Yes          Yes

No          No
209

Primary Insurance
- Bank Identification Number (BIN)
- Process Control Number (PCN)
- Primary Group ID
212

See FIG. 10

Denial of Benefit

Primary Claim Result
213

Paid Claim
- Enter Co-Pay
214

Denied Claim
- Enter Rejection Code
215

Generate Coupon / Dispense Code
- BIN # / PCN # /GROUP ID MEMBER ID #
- Instructions
- Conditions
216

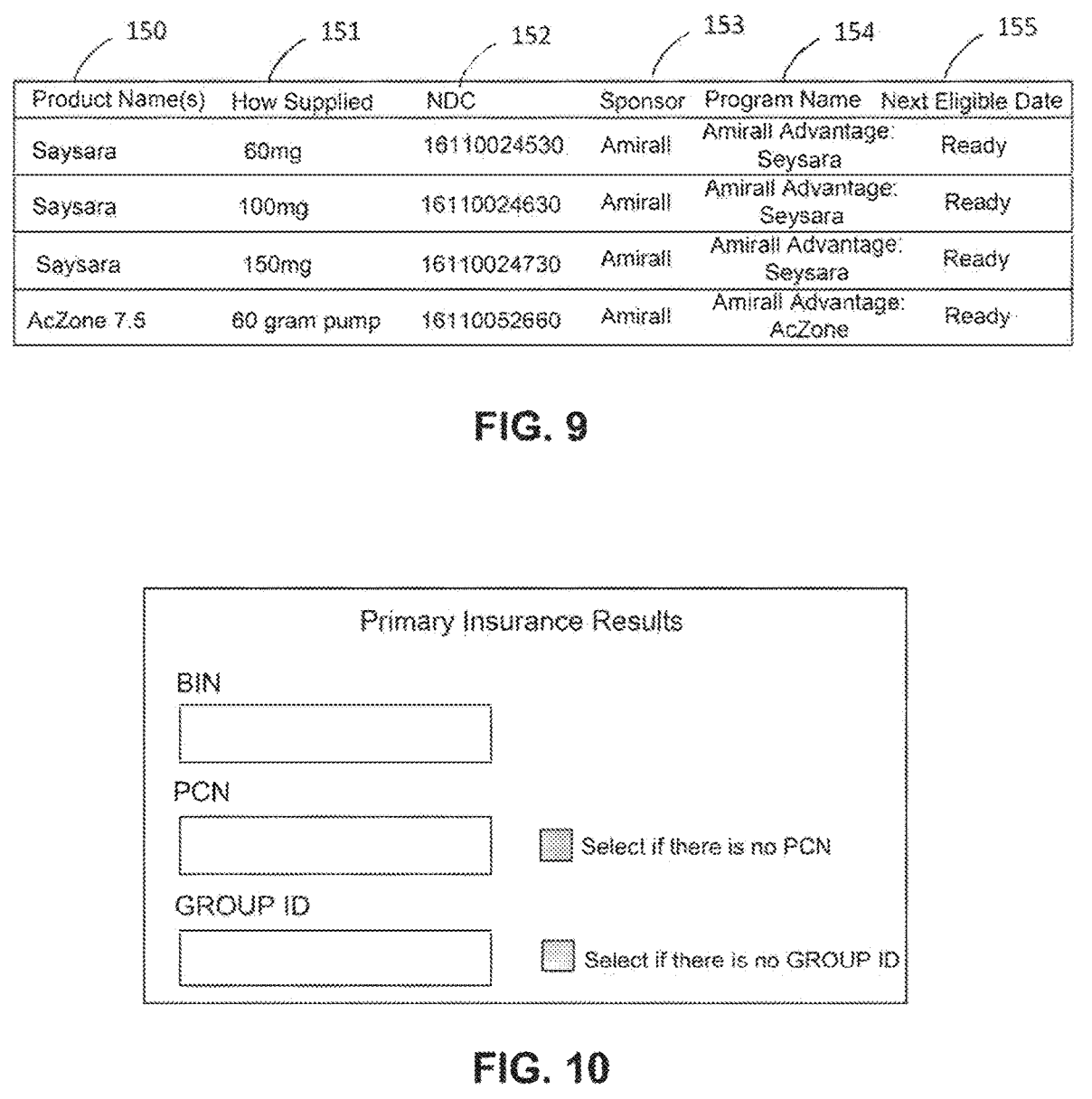

| Product Name(s) | How Supplied | NDC | Sponsor | Program Name | Next Eligible Date |
|---|---|---|---|---|---|
| Saysara | 60mg | 16110024530 | Amirall | Amirall Advantage: Seysara | Ready |
| Saysara | 100mg | 16110024630 | Amirall | Amirall Advantage: Seysara | Ready |
| Saysara | 150mg | 16110024730 | Amirall | Amirall Advantage: Seysara | Ready |
| AcZone 7.5 | 60 gram pump | 16110052660 | Amirall | Amirall Advantage: AcZone | Ready |

Primary Insurance Results

BIN

PCN

☐ Select if there is no PCN

GROUP ID

☐ Select if there is no GROUP ID

FIG. 10

250 — Launch NCPDP Request In Software A

252 — Switch Routes NCPDP Request

260 — API Parses NCPDP Request Into Machine-Readable Object

270 — Software B Processes Request Using Object Data

280 — Software B Updates Object With Response Data

290 — API Generates NCPDP Response message

292 — Switch Routes NCPDP Response to Provider

300 — Software A Processes NCPDP Response

PROCESS AND SYSTEM FOR THE MANAGEMENT, STORAGE AND AUTOMATION OF HEALTH CARE INFORMATION AND APPLICATION PROGRAM INTERFACE THEREFOR

CROSS-REFERENCE TO RELATED PATENT APPLICATIONS

This patent application is a Continuation of U.S. Non-provisional patent application Ser. No. 18/646,511 filed 25 Apr. 2024; which is a Continuation of U.S. Nonprovisional patent application Ser. No. 17/399,178 filed 11 Aug. 2021; which claims a benefit of priority to U.S. Provisional Patent Application 63/208,861 filed 9 Jun. 2021; each of which is hereby incorporated by reference for all purposes.

TECHNICAL FIELD

The present disclosure relates to a new system, and process for the optimization of computer systems where the generation and transfer of digital information between a plurality of software, stored in a plurality of databases must be coordinated. More precisely, in the field of health care, the use of software patches in conjunction with highjack of unique protocol features using, for example an Application Programming Interface (API) or similar software modification to leverage transmission segments of a protocol, such as the NCPDP v. D.0 Telecommunication Standard, to generate information and automated responses in a second software for use in a first as part of a system, used in a process and method of use thereof.

BACKGROUND

In the United States, there is no simple governmental health care or often called "single payer" socialized solution. As a result, individuals use multiple resources to help pay for their health care services and the associated prescriptions often for procurement at pharmacies. At one end of the spectrum of Americans, some are not insured (no primary) and can use cash to payment or rely on other type of safety nets. At the other end of the spectrum, luckiest users rely on some benefit from enrolment into Medicare® and Medic-aid®, governmental run systems which often covers services and drugs in a similar way as many socialized systems (e.g. where secondary payments can exist from mutual services or a larger co-pay for elected and non-prescribed services). In the larger center of this spectrum, where most people are found, many have either employer-sponsored primary coverage, secondary coverage, or a complex system of primary and secondary insurances. To put things mildly, in the United States the system is very complex, hospitals and service providers often send bills that few users understand and insurances often write to customers in ways that fool even the best. In the United States, systems which help any type of process from the side of the user or from the angle of a pharmacist is a great improvement to social welfare and well-being. In today's complex mosaic of payment structures, technologies which facilitate portions of this process are not obvious as they would have been uncovered and used because of the financial incentive involved. Also, such technologies in this field are not abstract and are substantially more than what is currently in operation and existence as evidenced by the complexity of this system and the financial interests involved.

A primary coverage, or primary insurance is often defined as the insurance coverage that pays out regardless of whether there are other insurance policies covering the same risk. Primary coverage as it is often described is contrasted with secondary coverage, which only pays out after a primary insurance policy has paid out. The secondary insurances pay some or all of the costs left after the primary insured has paid (e.g. deductibles, copayments, coinsurances). For example, primary coverage may reimburse 95% of a cancer treatment but only pay for 50% of services linked with home care related to the cancer. A secondary insurance would then serve, if possible, to pay out of pocket costs of the 5% of the main treatment and the other 50% of the rest.

In addition to payment of deductibles, copayments, or coinsurance, in the United States multiple third parties have tried to play a role to help make their drugs and services more affordable and more available to users. Unlike normal products that are sold unregulated at the price fixed by the retailer or manufacturer, the price of drugs is highly regulated and a great subject of controversy. For example, some drug manufacturer offer such deals as "if you cannot afford [drug X], then [manufacturer X] can help." As one can imagine, the payment of rebates is optimized when only a drug is not covered by a primary or secondary insurance or that certain unique conditions are in play. As a consequence, the process and system of placing rebates aka 'coupons' for certain drugs is highly complex. Each time, the system must run complex algorithms to make sure the benefits are due.

For example, Hoffman et al. secured in 2011 U.S. Pat. No. 7,957,983 directed to a new method for using an "administrator" to help manage medication therapy management, adherence to programs, and the implementation of pharmacosurveillance programs. Using a central pivot third party, multiple issues unique with the world of legal drugs can be manages such as the control of addictive drugs, medicine interference, over-prescriptions, or the use of multiple third party programs. In the above, this technology attempts to solve problems that are the purview of a payer and not a user. What is needed is a new system which helps coordinate and manage optimization of costs for a patient and to offer those in the process, such as pharmacists guidance and simplified user interfaces.

The NCPDP Telecommunication Standard

While this technology is not limited to a single protocol or standard and describe generally a process, method and system which can be implemented on any software system or protocol, including new protocols to be implemented upon need, the NCPDP Telecommunication Standard, commonly in use today can help explain and describe the technology. One of ordinary skill in the art will understand how the below-described embodiments should be read in context of the evolving field in this art.

As one can imagine, the process for the transfer and purchase of drugs, which often require prescriptions from a prescribing physician is highly regulated and subject to much control and protection. Also, because large parties are involved, often governmental agencies, the protocol must be based on evolving medial codes and levels of securities to avoid personal and confidential HIPAA protected personal information to fall into the wrong hands.

The National Council for Prescription Drug Programs (NCPDP®) was founded in 1977 representing most sectors of the pharmacy services industry. The NCPDP is named in the Health Insurance Portability and Accountability Act and the Medicare Prescription Drug, Improvement, and Modernization Act as a key actor in the field. The NCPDP have created standards such as the Telecommunication Standard and Batch Standard, the SCRIPT Standard for Electronic Prescribing, and the Manufacturers Rebate Standard.

FIG. 1 from this protocol shows a diagram that illustrates under Version D and above for the communication between Providers and Adjudicators as a two-way. As shown, some processors can be (a) an adjudicator, either directly speaking to the Provider, via a "switch" using an Intermediary before or after the "switch" or on the right of FIG. 1 using a Facilitator connected to the switch to help manage between a Primary Adjudicator as the Processor and the Secondary Adjudicator as the Processor.

As part of the standard, "Provider" is defined as a retail pharmacy, mail order pharmacy, doctor's office, clinic, hospital, long-term care facility, or any other entity, which dispenses prescription drugs and submits those prescriptions to a payer for reimbursement. The term "Adjudicator" aka "Processor" is often a third-party administrator of prescription drug programs on behalf of insurers. The Adjudicator may also be an insurer, a governmental program or any other entity, which receives prescription drug claims, makes a decision regarding the level of reimbursement to the provider, and transmits a response to the provider. In the above, "Intermediary" is a party that receives a claim from switches or providers, perform editing/messaging and then either pass the claims to the appropriate switch or adjudicator or return (reject) claims to the providers. The reply from the adjudicator may also pass to an intermediary for editing and messaging on its return to the provider.

Some processors may not support "Dial-Up" communication, centralized claims processing, or reliability in communication may use a "Switch" which receives transactions from providers and intermediaries as claims pass from providers to adjudicators. Switching companies accept claims, optionally perform format conversions, may perform pre-editing, and then pass the claims to the appropriate processor. As part of most protocols of communication, the goal is to structure the data to be sent, along a stream of data which allows for a target and a recipient to talk.

FIG. 2 also from the prior art shows what is called a "payer-to-payer" mode between two Adjudicators instead of a communication between an Adjudicator and a Provider. As shown at FIG. 1, the protocol uses both Switches and "Facilitators" in an effort to communicate. For example, when Medicare Crossover communications between Medicare and other payers happen, this can be done as shown at FIG. 2. Also, when information is reported for Medicare Part D from payer to facilitator to payer, the system can be used as what is called "Medicare Part D payer-to-payer facilitation."

Said broadly, under the protocol, a Provider first transmits to the primary insurance which will return a message over the protocol. Then, the Provider transmits all non-primary claims to the Switch, which routes them to both the Secondary, Tertiary, etc., Adjudicator and to the Facilitator. The Facilitator may create and send reporting transactions containing Secondary, Tertiary, etc. By way of incorporation by reference, and to avoid overwhelming the reader, the Telecommunication Standard, Version D.0 and other previous versions is attached hereto and the above is described in greater detail, for example, at Section 3.2.2

The protocol is rather complex, and includes Mandatory (M) segments to a transaction, Situational segments (R, RM, Q, or QM) which are respectively Required, Required for Medicaid Subrogation only, Qualified Requirement or Qualified Requirement for Medicaid Subrogation. Next values of segments can be Informational Only (I), Optional (O), Not Used (N), or finally Repeating (*R*). Generally speaking, while strings of values and code are sent of a fixed type, each field is described as a field (e.g. 503-F3), a field name, a segment description above (M, R, RM, Q, QM, I, O, N, or *R*) and a "situation" or portion that describes and puts context.

Generally speaking, the Protocol has: (a) Eligibility Verification, (b) Eligibility Verification Request Segments, (c) Eligibility Verification Response, (d) Transmission Accepted/Transmission Approved, (e) Transmission Accepted/Transmission Rejected/Transmission Rejected/ Transaction Rejected. Next the protocol includes (i) Claim billing or Encounter Request, (ii) Claim Billing or Encounter Response as part of Transmission Accepted/Transaction Paid, Transmission Accepted/Transaction Capture, or Transmission Accepted/Transaction Rejected. Finally, there is a final Transmission Rejected/Transaction Rejected claim communication.

While the above helps the reader understand the background in which the disclosure was created, one of ordinary skill in the art will understand the above to be only one of a large number of possible ways in which the technology can be practiced. The disclosure relates to improvements of use in the process and associated software linked with networks and systems utilizing the Telecommunication Standard, August 2020 from the NCPDP.

The API

Readers cannot understand the disclosure unless they also know important basic tools which are implemented in today's modern software world, many use what is called generally an Application Programming Interface aka an API. These short strings of software code play the role of intermediary that allows two applications to talk to each other. An API is the messenger that delivers your request to the provider that you are requesting if from and then delivers the response back to you.

API's enable developers to make repetitive yet complex processes highly reusable with a little bit of code. Often, functionalities of software can be off-sourced using simple API's. For example, a software may be programmed to operate on a computer system with a single screen. The use of two screens, each sharing the space can be optimized with an API. What is contemplated and described is any type of API including for example Java API's, program centric APRI's or Web API's such as Simple Object Access Protocol (SOAR), Remote Procedure Call (RPC), or a Representational State Transfer (REST) API.

In one embodiment, there is has been used JavaScript Object Notation (JSON) as the source of a possible API. JSON is both human-readable as well as machine-readable. Most modern programming languages (e.g., Java, JavaScript, Ruby, C#, PHP, Python, and Groovy) and application platforms provide excellent support for producing (serializing) and consuming (deserializing) JSON data.

As part of the art, systems exist where multiple computers are put in network and where each computer is equipped with a series of interconnected software applications equipped to use the NCPDP protocol to help exchange between different actors different requests and payments for services and drugs as described at FIGS. 1 and 2. Sadly, because of the sheer complexity and particularity in the technology and protocols embodied and used in these systems, changes are not easy to implement in a way the industry as a whole or locally can implement to improve the processes. What is needed is a set of tools, designed to help pharmacists to quickly and more effectively check for primary and secondary coverage for drug and service users which, from a click will allow for any new change in this industry to be rapidly and effectively implemented without burdening the pharmacist at the point of service of the drug or service.

SUMMARY

The present disclosure relates to a new system, and process for the optimization of computer systems where the generation and transfer of digital information between a plurality of software, stored in a plurality of databases must be coordinated. More precisely, in the field of health care, the use of software patches in conjunction with highjack of unique protocol features using, for example an Application Programming Interface (API) or similar software modification to leverage transmission segments of a protocol, such as the NCPDP v. D.0 Telecommunication Standard, to generate information and automated responses in a second software for use in a first as part of a system, used in a process and method of use thereof. In this disclosure, a specific portion of the protocol designed and used by the API to avoid the use of an entire standalone software solution designed to generate customized coupons often resulting from an advanced management of secondary insurance solutions and other secondary coverage.

DESCRIPTION OF DRAWINGS

The drawings described herein are for illustrative purposes only of selected embodiments and not all possible implementations, and are not intended to limit the scope of the present disclosure.

FIG. 6 and FIG. 7 illustrate several possible pages and operating windows of the software interface of a possible pharmacist for entry of the primary coverage request for use under the process and system for the automation of health care information and application program interface therefor according to an embodiment of the present disclosure.

FIG. 8 is a diagram which represents the different functional and software steps which describe a service for the calculation and generation of a coupon of secondary benefits linked with additional coverage for any primary claim for use in a software operated by the pharmacists according to an embodiment of the present disclosure.

FIG. 9 and FIG. 10 illustrate several possible pages and operating windows of the software interface of the service for the calculation and generation of a coupon code for secondary benefits linked with additional coverage for any primary claim for use in a software solution as shown at FIG. 8.

Corresponding reference numerals indicate corresponding parts throughout the several views of the drawings.

DETAILED DESCRIPTION

Figure 1:
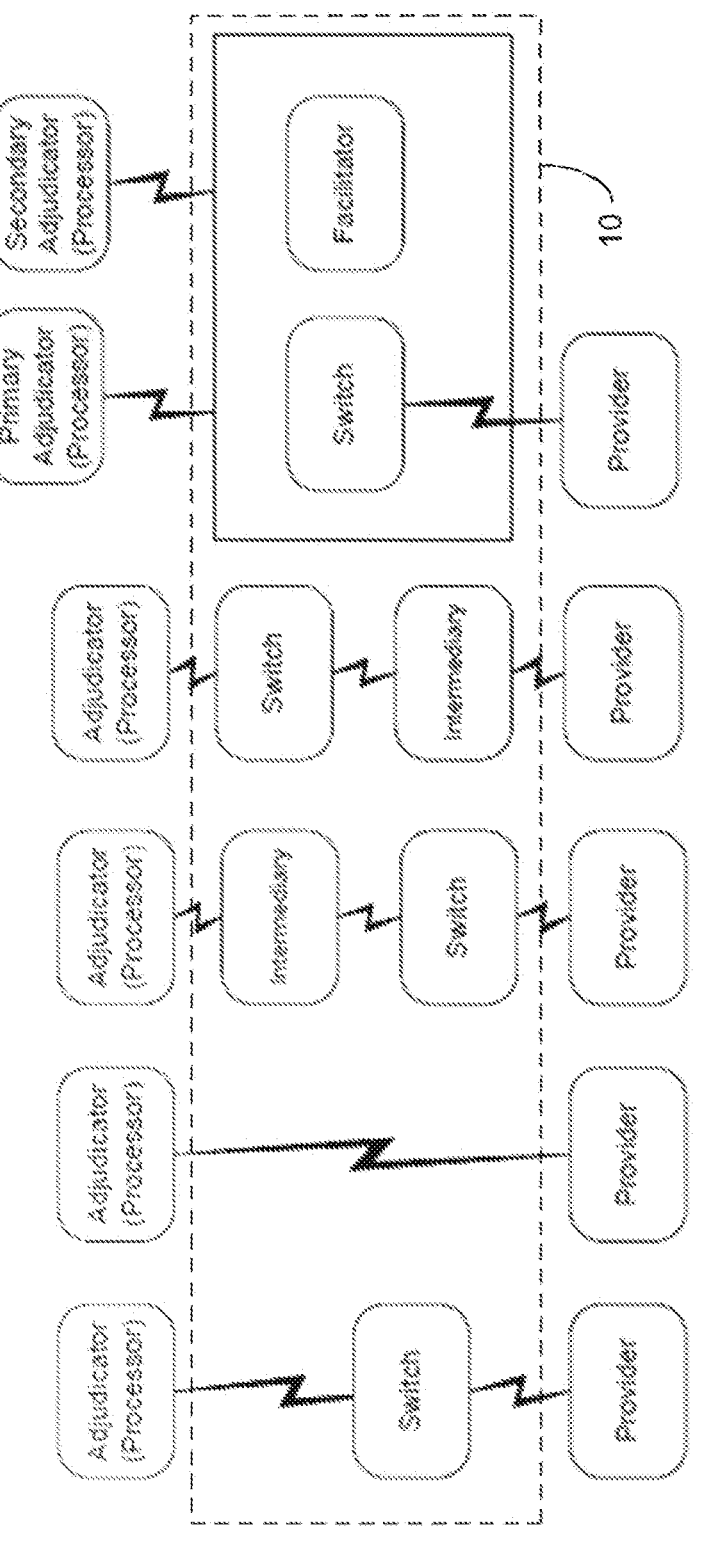
FIG. 1 is an illustration from the prior art illustrating the Processor to Provider communication between actors of the health care industry under the NCPDP Telecommunication Standard v. D.0.
Figure 2:
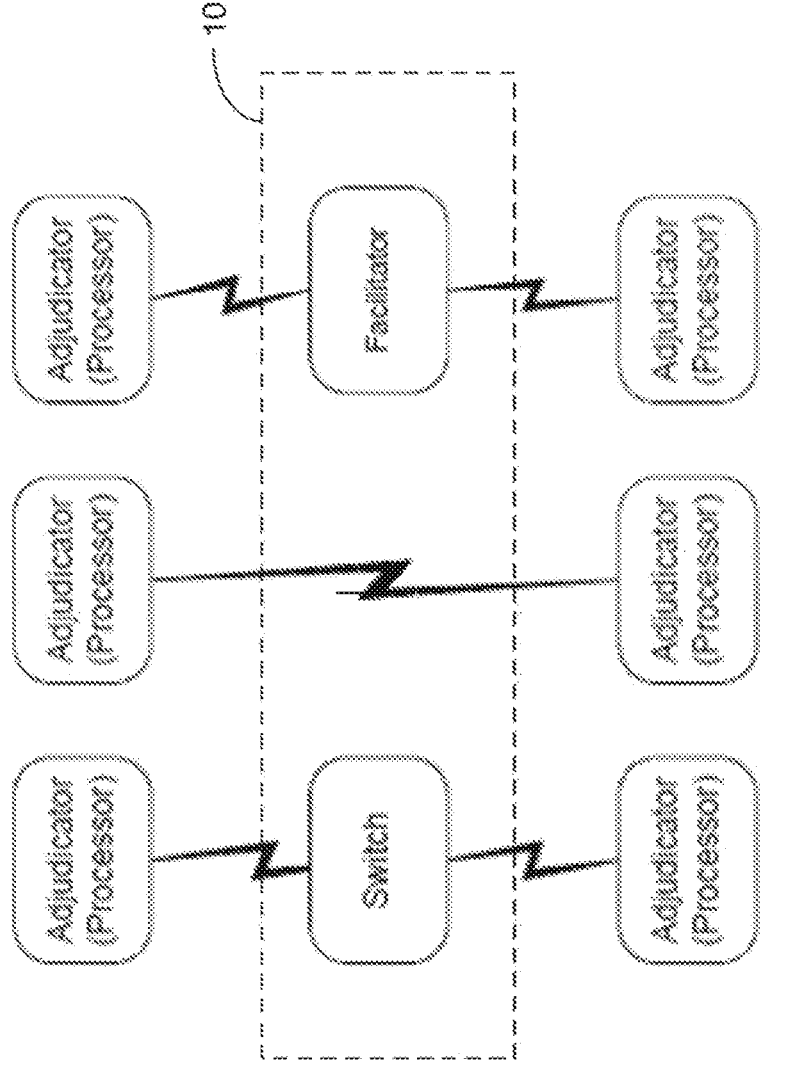
FIG. 2 is an illustration from the prior art illustrating the Processor to Processor communication between actors of the health care industry under the NCPDP Telecommunication Standard v. D.0.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Hardware

Figures 3, 4:
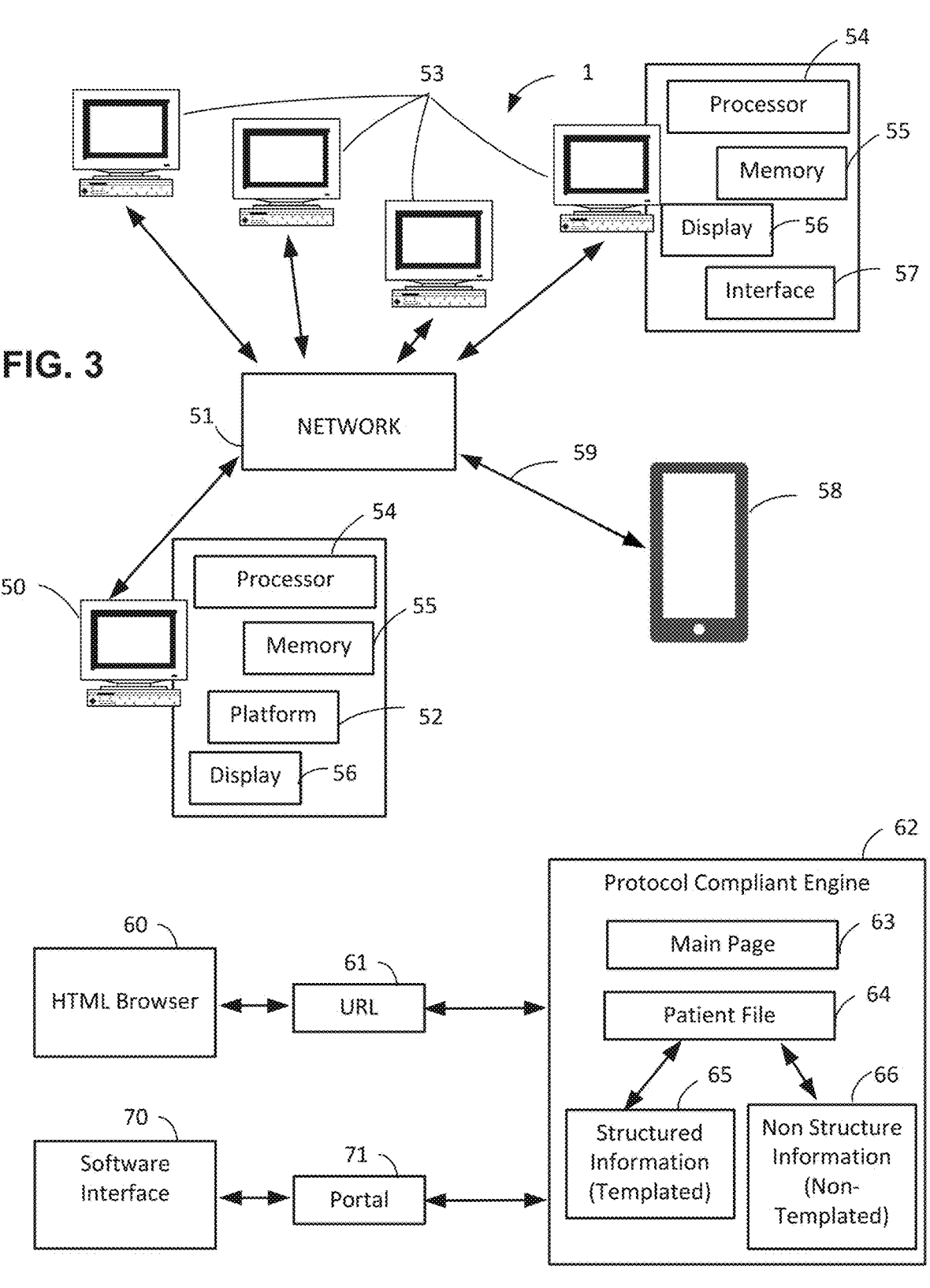
FIG. 3 is an illustration of a possible hardware architecture in which the process and system for the automation of health care information and application program interface therefor described here below can be implemented according to an embodiment of the present disclosure.
FIG. 4 is an illustration of the different software solutions to be implemented in the different computers shown at FIG. 3 and associated structuring of user-interface implementation for the implementation and operation of the process and system for the automation of health care information and application program interface therefor according to an embodiment of the present disclosure.

FIG. 3, this is an illustration of one possible configuration of a typical hardware network and setup and associated software structures 1 that use one of multiple types of network 51 and computer environment for implementation of a software system or solution illustrated around it for the use of the software shown hereafter. FIG. 3 shows generally a spider-like system 1 where a user (not shown but for example a pharmacist) uses either a computer 58 or other device, such as a phone, a web enabled phone, a pad, or any other type of computer device at the location where the software is at least in part located. Here, to help understand, several identical computers 50, 53 are shown in addition to 58 to help understand the diversity of use and configuration. A user over the device 58 connected 59 to the network 51 or to help understand. For example, a user can log into a server 50 via a network 51 such as the internet or a LAN. What is also contemplated is the use of partial internal networks operating remote or in tandem with the internet. For example, a hospital may have a LAN-based internal system and network which could be connected externally.

The connection will be done, for example, over a network 51 such as the Internet, a LAN either cloud-based or other related technologies. As shown, several computers 50, and 53 (and also 58), are designed with a processor 54 for calculating and running software, a memory 55 connected to the processor 54 for use of a display 56 over some type of interface 57. Here, the system or platform 52 where a software resides for operation is located on a server 50 capable of operating centrally or in a cloud the software package. Also, not shown is the process of uploading from a server, either locally or remotely the software for installation locally and for operation with a website or software located on the server 50 for the processing of data. Most systems are now designed for use by thousands of users and the database is either localized in the memory or used in a centralized platform 52 in one remote computer or cloud-based memory for operation.

Also shown at FIG. 3 is a structure of computer network arrangement 1 but as one of ordinary skill will understand, these systems are highly modular and differ from one location to the next and while one possible configuration is shown, one of ordinary skill will understand the plurality of configurations able to allow this disclosure to operate as a process, a system or a method. With time pharmacists or other users will be able to access the system 1 using an iPad or from a remote location while still connected with their own computer 50 for operating according to this disclosure. Also, portable, compact and discrete solutions of hardware are being implemented that will not alter the fundamental way what this disclosure discloses. For example, the current solution can operate in tandem with automated display dispensers, live pharmacists on automated remote systems, to name a few.

Moving to FIG. 4, having shown above how multiple types of hardware configurations now can exist, this second diagram illustrates the different software solutions to be implemented as interface 57 for access to a platform 52 from FIG. 3 and associated structuring of user-interface implementation for the implementation and operation of the process and system for the automation of health care information and method thereof. As shown, software solutions 62 (later shown as Software A and Software B), that are protocol compliant engines for operating different object can be programmed with either a URL interface 61 that is accessed via a HTML format web browser 60. Alternatively, in most industry and highly secure software solutions, a portal 71 is created with a software interface 70. The system 1 as in FIG. 3 has software locally at 58 or 53 and locally at a central location 50 for processing of data. Using device 58 shown at FIG. 3, a person can, for example upload an App from an App store or a software from the internet from the home computer 50 or placed locally. FIG. 4, using an HTML browser 60 or directly via an App interface or other software, via a URL 61 or some type of dynamic connection specific to the data is connected. The system 62 described above as 50 which appears to be some type of website with a main page 63 and subpages 64 such as for example tabs with patient or prescription-specific tabs to offer structured information 65 or non-structured information 66. Users navigate the website 62 via these pages 63, 64 to enter and deliver structure and non-structure data. Many software have tabs instead of HTML surfing tools. So shown is a hardware and first layer of software generally known in the art. Not shown is the indexing and use of databases. What is described generally is the use of multiple layers of software, such a basic operating system (e.g. IOS, Windows, etc.) designed to serve as base on which a Software Interface 70 or HTML Browser 60 can be operated. Once again, while the illustration of FIG. 4 suggests that the Protocol Compliant Engine 62 is located remotely via a portal 71 or a URL connection 61, one of ordinary skill in the art will understand that such solutions can be, if needed localized in a single computer and the connections 61, 71 can be internal to a LAN, another network or even a single machine.

Figure 5:
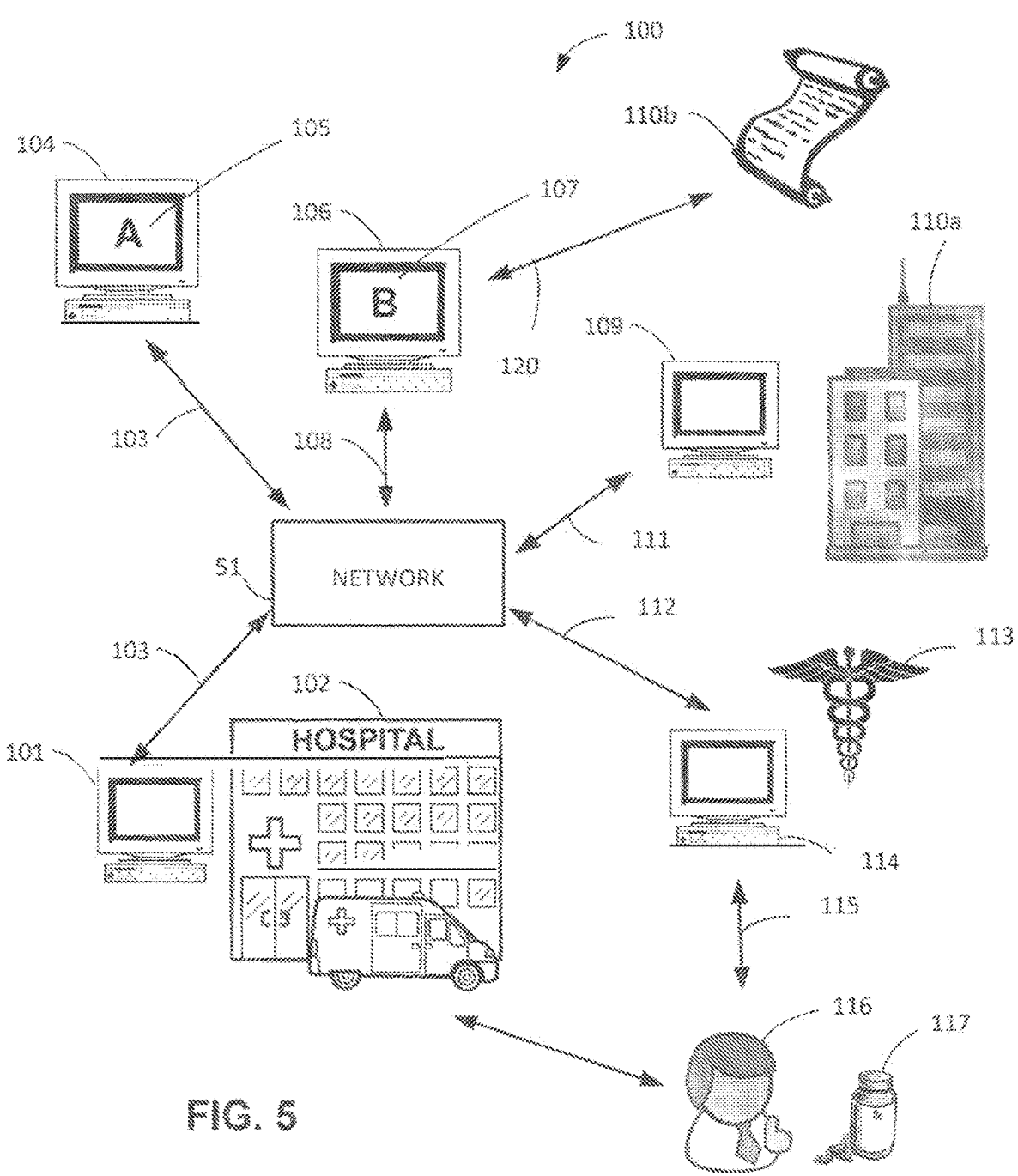
FIG. 5 is a functional and representative diagram of the different actors and Processors to Providers to be connected using a hardware solution as shown at FIG. 3 and operating a group of software solutions as shown generally at FIG. 4 which operate under a protocol for the process and system for the automation of health care information and application program interface therefor according to an embodiment of the present disclosure.

Turning to FIG. 5, what is shown is a functional and representative diagram of the different actors, often called under the protocol Processors to Providers to be connected using a hardware solution as shown at FIG. 3 and operating a group of software solutions as shown generally at FIG. 4 which operate under a protocol for the process and system for the automation of health care information and method thereof according to an embodiment of the present disclosure.

Shown as 100 is the representation of the different actors according to one embodiment which play roles of the hardware of FIG. 3. In the center is still network 51 to help with readability over the different figures. To help numbering, some of the computers have been renumbered to coordinate the set to 100-117 to better guide the reader. While renumbering has been offered, one of ordinary skill will understand that such have no effect on what is shown or described. As shown at the bottom row of FIG. 1 from the prior art, a Provider shown is a hospital 102 which offers services. In some cases, the hospital 102 is the party which will dispense and deliver drugs or other services using a station 101 of some type connected 103 to the network 51.

Another possible Provider is shown as 113 as a pharmacy also with a terminal 114 also equally connected 112 to the network 51. In the case of the pharmacy 113, it could be in reception of an order from the hospital 102 over the system under the protocol. Doctors could issue scripts or prescriptions and enter them into the system 100. Illustrated is a patient or consumer 116 who is in need of medication 117. This user is the one who has an identity, a medial history, a prescription to be filled and has a unique insurance and payer (Adjudicator/Processor) set as described in FIG. 1.

Also illustrated is one of a numerous number of Payer for example insurance 110 which has a terminal 109 for connected 111 to the network as part of the system. Shown as 110 is a secondary coverage promise, rebate, insurance contract. While in some case these secondary insurance providers are insurances of themselves (e.g. 110) they also can be a more detached promise which binds some or all of the people 116. For example, a drug manufacturer could issue a promise to reimburse one drug under precise conditions such as a co-pay promise.

Shown as 104 and 106 are two computers each having a different software solution 105 and 107 running in the system. Each is connected to the network 103, 108. As described herein, to help understand how two solutions can co-exist on different or similar computers, there are represented these devices 104, 106 as two standalone systems. One of ordinary skill in the art will recognize that the computers of the Provider 101, 114 such as a hospital or a pharmacy are designed to have both of these applications A, B (e.g. Software A, Software B), locally or remotely via a portal as described at FIG. 4. Systems can include two windows but will run different demands differently. For example, Software A at 105 can be connected via the network to the insurance 110 but not to external contracts and secondary payment schemes 110. Alternatively, Software B 107 can be designed to optimize the relationship between the secondary payers and external contracts 110 via the link 120. In this configuration, the Payer must open Software A 105, run a request for primary coverage and reimbursement (e.g. 50%) from a source such as 110. Then, the same Provider must have access to Software B 107 and open this new application. The Provider will then have to enter data redundantly and try to secure data and information from Software B about the different secondary insurances available such as 110.

FIG. 6 shows one window of a possible configuration and embodiment of Software A 105 which relates to any number of software solutions designed to secure using the NCPDP protocol information on a primary insurance. For example, as shown at 130, a patient's information can include the name and address along with a social security number. Other parameters such as the language, the street location can be connected 131, 132. On each of these software, a script/prescription is received under the NCPDP protocol which will match the identity of the patient. If the patient is not in the system, a protocol is set up to help pharmacists and doctors create a patient's identity and profile. FIG. 7 shows how the primary insurance is connected to the patient 133 and in some cases several options can be given. Here, using button 134, the primary insurance is selected. The Software A 105 having the identity of the client and the received prescription from the service provider, will be able to generate a NCPDP request up to the Adjudicator (Processor) as shown at FIG. 1. For example, if the prescription requests 400 capsules of drug X, the primary insurance may be queried on an upload message which is then returned down to the Provider in the bilateral communication under the protocol.

FIGS. 9 and 10 shown specific illustrations of images from a Software B 107 which is designed to optimize the participation of secondary service providers. FIG. 8 illustrates a diagram which represents the different functional and software steps which describe a service for the calculation and generation of a coupon of secondary benefits linked with additional coverage for any primary claim for use in a software operated by the pharmacists according to an embodiment of the present disclosure.

The process 200 for generating a coupon or denial thereof begins at 201 with a simple access to the Software B 107 using in one embodiment a classical contact and password. While this represents one possible mode of access as shown at FIG. 4 at either 61 or 71. But one of ordinary skill in the art will recognize that as facial recognition features and other biometrics arrive on the market, they may be used along with other access processes known in the art.

As part of this secondary Software B 107, the Provider 112 or 102 (as shown by 106) will select a provider such as itself (e.g. a pharmacy) 203. The redundancy is already apparent as Software B 107 is connected to a database 205 and has for best purpose to manage the secondary coverage. Next, as shown with greater detail at FIG. 9, for each selected Provider 203 is uploaded and displayed a list of all co-pay available. The database access 205 which has each pharmacy or Provider 206 accessed one of many co-pay programs includes multiple key metrics for use and indexing 202. For example, if a small California-based corporation wants to offer a rebate certain limited coverage for one specific drug when purchased in 400 capsule format, the database 205 can be programmed to include the promotion 205. It will be assigned only to pharmacies 206 in a certain area and could also include a specific address of residence. Entry of this promotion and co-pay program 202 is time consuming and as shown requires the entry of a product name, a supplier type, the NDC, the sponsor, the program name and the date/status. One of ordinary skill in the art understands the variability and flexibility requires for this use and Software B 107 and why this technology cannot be unboarded within the Software A 105. The NDC number the National Drug Code which serves as an identifier for products. As shown at FIG. 9, offered back from the database is a product name 150, the type of supply and format (e.g. 60 mg), the National Drug Code (NDC) 152 which connects the product and avoid errors by creating a redundancy in the descriptive and the corporation/name of the sponsor. Here, it may be the drug manufacturer 153, a third-party, or any other party. The name is also entered to help the Provider understand if he has the proper program in mind 154 and finally a status/order selection 155. Some offerings could be seasonal or temporary or even limited to a certain budget.

Next at 207 the system and process will select one co-pay available from the given list from the database 205 and as shown at FIG. 9. In some cases, one of ordinary skill in the art can understand that several co-pay could be offered and offer different non-additive benefits. To select, the person adds the #, the name and nature of the benefits. The patient is then qualified 208 in a first step of qualification. In a positive and negative option (Y/N) the selected patient may be found not to be eligible for the co-pay. For example, if the person is on Medicare®. In that case, the secondary co-pay benefit will be immediately denied 209. The qualification process can be complex and multi-stage 210. Several questions and conditions may be imposed by the co-pay secondary insurance. For example, in the case of an HIV drug, the person must demonstrate it is not eligible to other preferential benefits which would be able to pay for the lifesaving medication. Also, the co-pay benefit may not be available to those who have a certain medical condition.

In the event the patient entered is qualified for the benefits, data 211 is then entered of the prescriber along with the National Provider Identifier (NPI). In an important step of the process illustrated by FIG. 10 and shown as 212 as a portion of the diagram, the information on the primary insurance is entered such as the Bank Identification Number (BIN), the Process Control Number (PCN) and the Primary Group ID. This information allows the system to know who is the primary claim payer. Then a claim result is requested 213 which is then analyzed at 214 and 215 for a determination if the claim has been paid and therefore there is no need for co-pay or the claim has been denied in whole, in portion or in part. In that case, rejection codes must be entered 215. The system then at 216 will generate a coupon/dispense code which will be unique to the claim and secondary insurance coverage. The coupon issued includes a BIN #, the CPN #, the GROUP ID which was entered along with the MEMBER ID and text such as instruction and conditions. Each MEMBER ID # is individual and customized to the transaction. Such information can then be entered in most Software A 105 systems under the tap "secondary coverage" or alternate coverage to reduce the price. This two-step is not unlike the entry of a coupon reduction in websites.

The API Technology

Figure 12A:
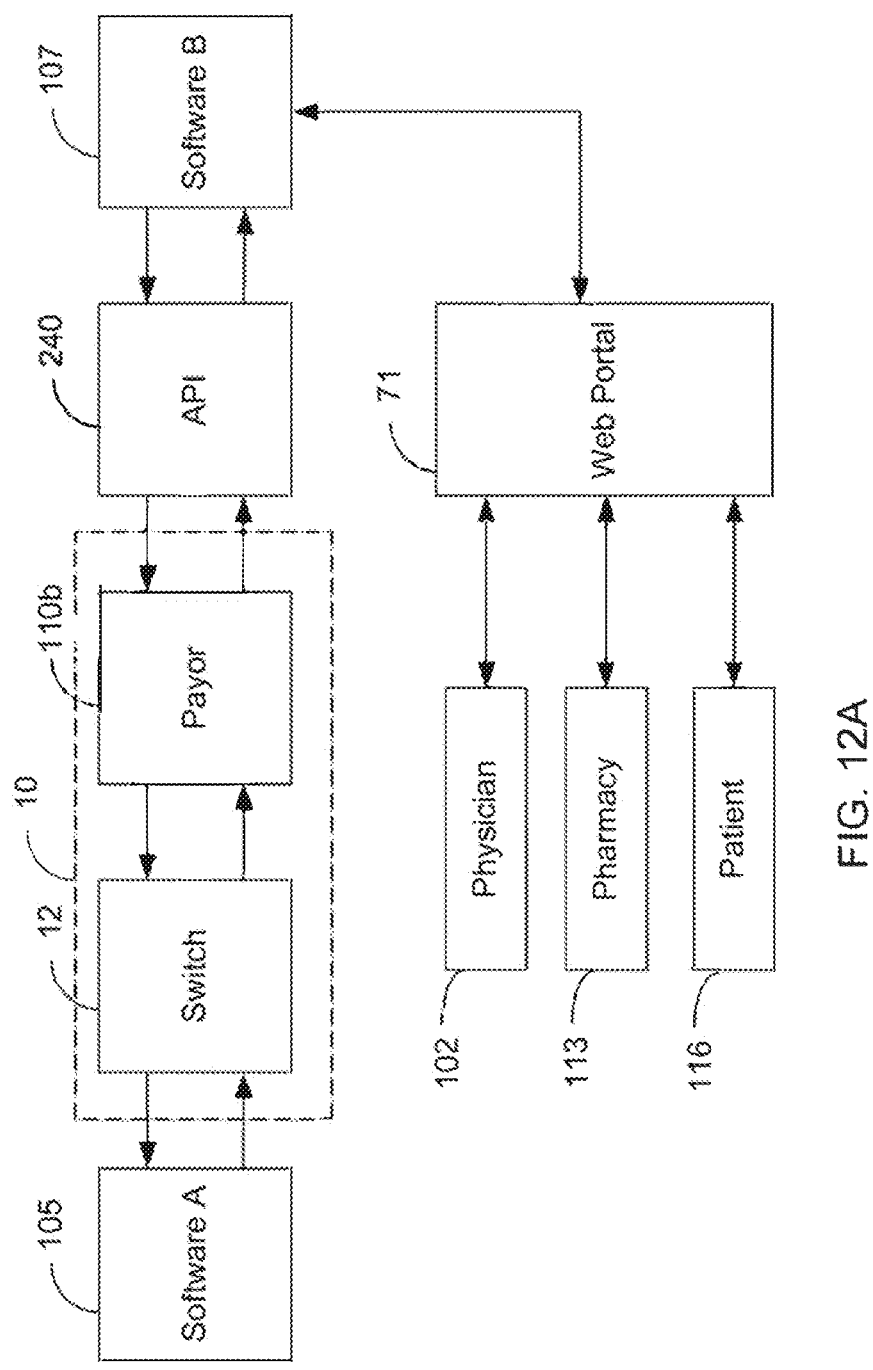
FIG. 12A and FIG. 12B are diagrams illustrating the function and transfer of API information between the different terminals or software for the process and system for the automation of health care information and application program interface therefor according to an embodiment of the present disclosure.
Figure 12B:
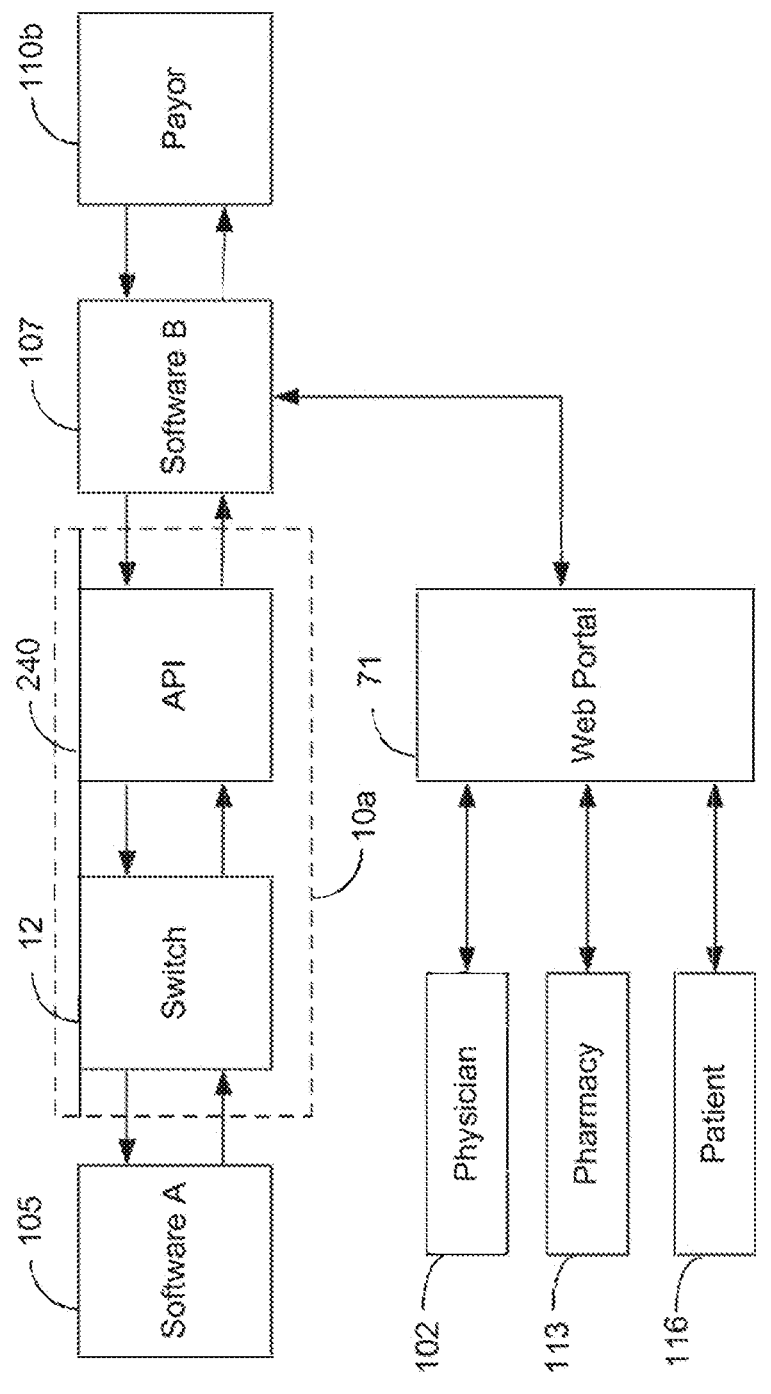

There is shown at each of FIG. 12A and FIG. 12B an API 240 which serves to transfer data (using the network 51 or not) from Software A to Software B and back for an enhance functionality. As part of the API data is requested from the Software A using, for example, JSON script tag. A full set and only require tags are listed to simplify the request:

| JSON Field | Reference Field | Required | Data Type | Description |
|---|---|---|---|---|
| npi | pharmacy_info | true | string | Valid 10-digit NPI number of the pharmacy |
| bin | insurance_info | true | string | Valid 6 digit BIN |
| pcn | insurance_info | false | string | Valid PCN |
| group | insurance_info | false | string | Valid group |
| member_id | insurance_info | false | string | Valid member id |
| patient_copay | bv_info | false | number | The patient copay amount from the primary insurance adjudication |
| reject_codes | bv_info | false | object | For each reject code, there is a separate key value pair, consisting of reject code index, and the actual reject code: For example, the first reject code would be "1": "70". The third reject code would be "3": "80". The object can contain as few or as many elements as required by the claim (i.e. as many reject codes as are actually present). |
| firstname | patient_info | true | string | First name of the patient. Can only contain alphanumeric characters along with period and comma. |
| lastname | patient_info | true | string | Last name of the patient. Can only contain alphanumeric characters along with period and comma. |
| dob | patient_info | true | string | Date of birth of the patient. Format: YYYY-MM-DD |
| gender | patient_info | true | string | M—male, F—female |
| state | patient_info | true | string | Valid US state code |
| address1 | prescriber_info | false | string | The prescriber's address |
| city | prescriber_info | false | string | The prescriber's city |
| firstname | prescriber_info | false | string | The prescriber's first name. Required if NPI is not provided. Can only contain alphanumeric characters along with period and comma. |

-continued

| JSON Field | Reference Field | Required | Data Type | Description |
|---|---|---|---|---|
| lastname | prescriber_info | false | string | The prescriber's last name. Required if NPI is not provided. Can only contain alphanumeric characters along with period and comma. |
| npi | prescriber_info | true | string | Valid 10-digit NPI number of the prescriber |
| state | prescriber_info | false | string | Valid US state code |
| zip | prescriber_info | false | string | Valid US zip code |
| ndc | product_info | true | string | Valid 11-digit NDC code (without hyphens) |
| days_supply | product_info | true | string | Valid positive Integer |
| number_of_refills | product_info | false | string | Valid positive Integer |
| quantity | product_info | true | string | Valid positive Integer |
| written_date | rx_info | false | string | Date the prescription was written. Format: YYYY-MM-DD |

To help explain, each variable is given a data type (string, number, Boolean, etc.). Then, each field is then broken down as either "required" or "not" using the values true or false. Each value is given a field and name. The core of the data above is what is needed for Software B 107 to run as shown at each of FIG. 12A and FIG. 12B. In the above, as the API runs, it uploads from Software A the above (when possible). For example, it loads (a) the pharmacy info (NPI), the BIN and the patient key data information. It then secures the prescriber info (NPI), the product info (NDC), the quantity and the day of supply. This data is then run by the API into Software B which is described at FIG. 8 logically, armed with the data entry will produce a response. As part of the response message, the software returns:

| JSON Field | Required | Data Type | Description |
|---|---|---|---|
| status_code | true | number | These are standard HTTP response codes. |
| success | true | boolean | Did the request pass the program rules' criteria? |
| message | true | string | This is the response message that will need to be returned in the NCPDP response. It will be no more than 1,000 characters long and should be transmitted using field 526-FQ ("Additional Message Information"). |

Using that information, the API 240 shown at each of FIG. 12A and FIG. 12B then runs this script. As shown above, the message can include the automation into the protocol change for better upload into the software.

The NCPDP Telecommunication Standard Implementation Guide Version D.0 for example describes the different protocol-based communications to travel and be exchanged over the systems as described at FIGS. 3-7. There is a process, system and method for using the above API 240 in a way that inserts itself invisibly into the NCPDP software programmed and is able to leverage the design specifications of segments of the code. For example, the code includes:

| | | Segment |
|---|---|---|
| Eligibility Verification Response | Transmission Accepted/Transaction Approved | Response Status Segment |
| Eligibility Verification Response | Transmission Accepted/Transaction Rejected | Response Status Segment |
| Claim Billing or Encounter | Transmission Accepted/Transaction Paid | Response Status Segment |
| Claim Billing or Encounter | Transmission Accepted/Transaction Captured | Response Status Segment |
| Claim Billing or Encounter | Transmission Accepted/Transaction Rejected | Response Status Segment |

** Other segments similar such as Transmission Rejected/Transaction Rejected, Service Billing/Transmission Accepted-Transaction Paid, etc.

As shown above, two messages (Approved and Rejected) have been noted as point of entry linked with the Eligibility Verification Response (e.g. a message asking if a person is eligible for primary coverage). The Response Status Segment breakdown for an Approved Transaction reads:

| Field | Name | Mandatory or Situational |
|---|---|---|
| 111-AM | Segment Identification | M |
| 112-AN | Transaction Response Status | M |
| 503-F3 | Authorization Number | Q |
| 130-UF | Additional Message Information Count (Required If Uses 526-FQ) | Q |
| 132-UH | Additional Message Information Qualifier (Required If Users 526-FQ) | Q *R* |
| 526-FQ | Additional Message Information (API Data Response FIG. 11 290) | Q *R* |
| 131-UG | Additional Message Information Continuity (Required only if Message 526-FQ is Repeated) | Q *R* |
| 549-7F | Help Desk Phone Number Qualifier | Q |
| 550-8F | Help Desk Phone Number | Q |

The Response Status Segment breakdown for a Rejected Transaction reads:

| Field | Name | Mandatory or Situational |
|---|---|---|
| 111-AM | Segment Identification | M |
| 112-AN | Transaction Response Status | M |
| 503-F3 | Authorization Number | Q |

-continued

| Field | Name | Mandatory or Situational |
|-------|------|--------------------------|
| 510-FA | Reject Count | R |
| 511-FB | Reject Code | R *R* |
| 546-4F | Reject Field Occurrence Indicator | Q *R* |
| 130-UF | Additional Message Information Count (Required If Uses 526-FQ) | Q |
| 132-UH | Additional Message Information Qualifier (Required If Uses 526-FQ) | Q *R* |
| 526-FQ | Additional Message Information (API Data Response FIG. 11 290) | Q *R* |
| 131-UG | Additional Message Information Continuity (Required only if Message 526-FQ is Repeated) | Q *R* |
| 549-7F | Help Desk Phone Number Qualifier | Q |
| 550-8F | Help Desk Phone Number | Q |
| 987-MA | URL | I |

The protocol also includes a Claim Billing request which also provides a Response Status Segment that is Transaction Accepted/Transaction Paid:

| Field | Name | Mandatory or Situational |
|-------|------|--------------------------|
| 111-AM | Segment Identification | M |
| 112-AN | Transaction Response Status | M |
| 503-F3 | Authorization Number | Q |
| 547-5F | Approved Message Code Count | Q |
| 548-6F | Approved Message Code | Q *R* |
| 130-UF | Additional Message Information Count (Required If Uses 526-FQ) | Q |
| 132-UH | Additional Message Information Qualifier (Required If Uses 526-FQ) | Q *R* |
| 526-FQ | Additional Message Information | Q *R* |
| 131-UG | Additional Message Information Continuity (Required only if Message 526-FQ is Repeated) | Q *R* |
| 549-7F | Help Desk Phone Number Qualifier | Q |
| 550-8F | Help Desk Phone Number | Q |
| 993-A7 | Internal Control Number | Q |

The protocol also includes a Claim Billing request which also provides a Response Status Segment that is Transaction Accepted/Transaction Captured:

| Field | Name | Mandatory or Situational |
|-------|------|--------------------------|
| 111-AM | Segment Identification | M |
| 112-AN | Transaction Response Status | M |
| 503-F3 | Authorization Number | Q |
| 130-UF | Additional Message Information Count (Required If Uses 526-FQ) | Q |
| 132-UH | Additional Message Information Qualifier (Required If Uses 526-FQ) | Q *R* |
| 526-FQ | Additional Message Information | Q *R* |
| 131-UG | Additional Message Information Continuity (Required only if Message 526-FQ is Repeated) | Q *R* |
| 549-7F | Help Desk Phone Number Qualifier | Q |
| 550-8F | Help Desk Phone Number | Q |
| 993-A7 | Internal Control Number | Q |

The protocol also includes a Claim Billing request which also provides a Response Status Segment that is Transaction Accepted/Transaction Rejected:

| Field | Name | Mandatory or Situational |
|-------|------|--------------------------|
| 111-AM | Segment Identification | M |
| 112-AN | Transaction Response Status | M |

-continued

| Field | Name | Mandatory or Situational |
|-------|------|--------------------------|
| 503-F3 | Authorization Number | Q |
| 510-FA | Reject Count | R |
| 511-FB | Reject Code | R *R* |
| 546-4F | Reject Field Occurrence Indicator | Q *R* |
| 130-UF | Additional Message Information Count (Required If Uses 526-FQ) | Q |
| 132-UH | Additional Message Information Qualifier (Required If Uses 526-FQ) | Q *R* |
| 526-FQ | Additional Message Information | Q *R* |
| 131-UG | Additional Message Information Continuity (Required only if Message 526-FQ is Repeated) | Q *R* |
| 549-7F | Help Desk Phone Number Qualifier | Q |
| 550-8F | Help Desk Phone Number | Q |
| 987-MA | URL | I |

As shown above the protocol has similar structure and functions when used in most of the return confirmations. Each time, the Response Message Segment is used in similar ways for Service Billing, Claim Reversal, Service Reversal, Claim Rebill, etc. There has been leveraged one or more informational response cues as part of the NCPDP to allow the Software A to secure information processed from FIG. 8 Software B 107. One of ordinary skill in the art will understand in the above that use of a segment of a response code, under a protocol is being used to avoid use by a party of the Software B and remain integrated into Software A.

Figure 11:
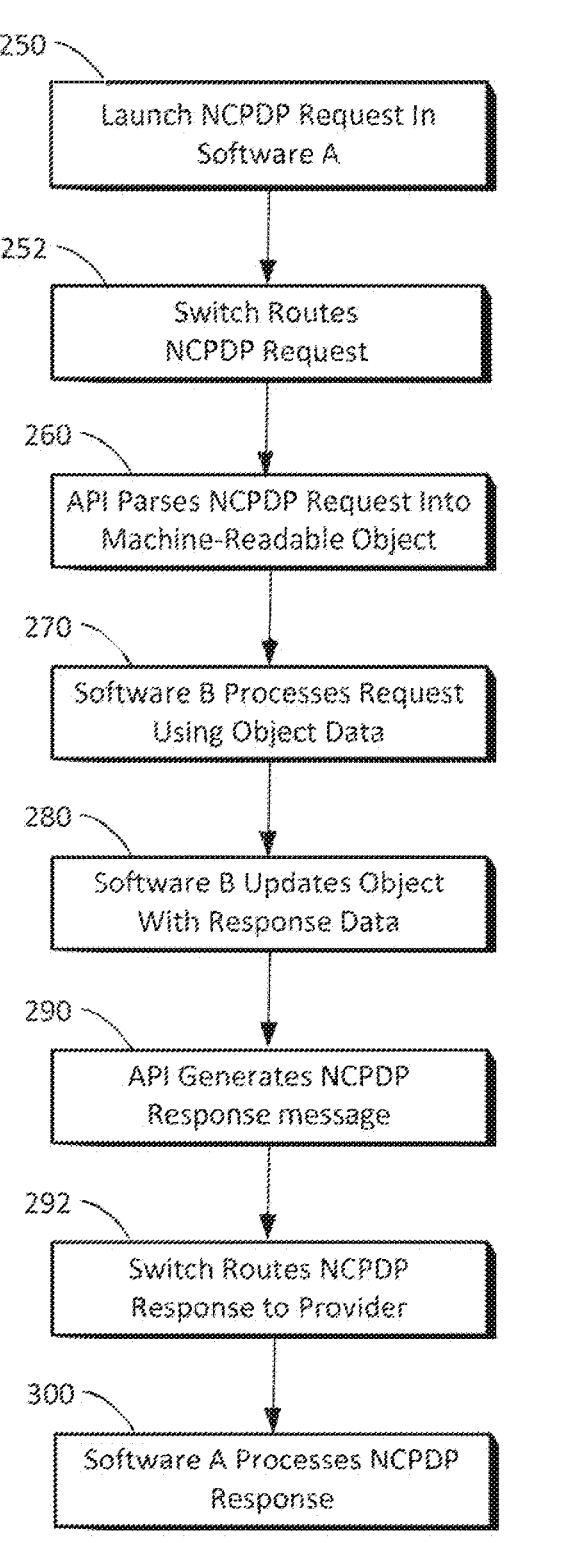
FIG. 11 shows a diagram representing the different steps and process for the system for the automation of health care information and application program interface therefor according to an embodiment of the disclosure.

FIG. 11 as shown describes generally and functionally how in a series of six steps of a first process, a request is launched in Software A 250, then JSON Fields are uploaded from Software A and referenced and the request for the API's data 260 faces Software B. Software B runs with the data entered 270 and generates as shown at FIG. 8 response data 280 to be sent back to Software A 300 via a push in field 526-FQ 209 generally.

Figure 13:
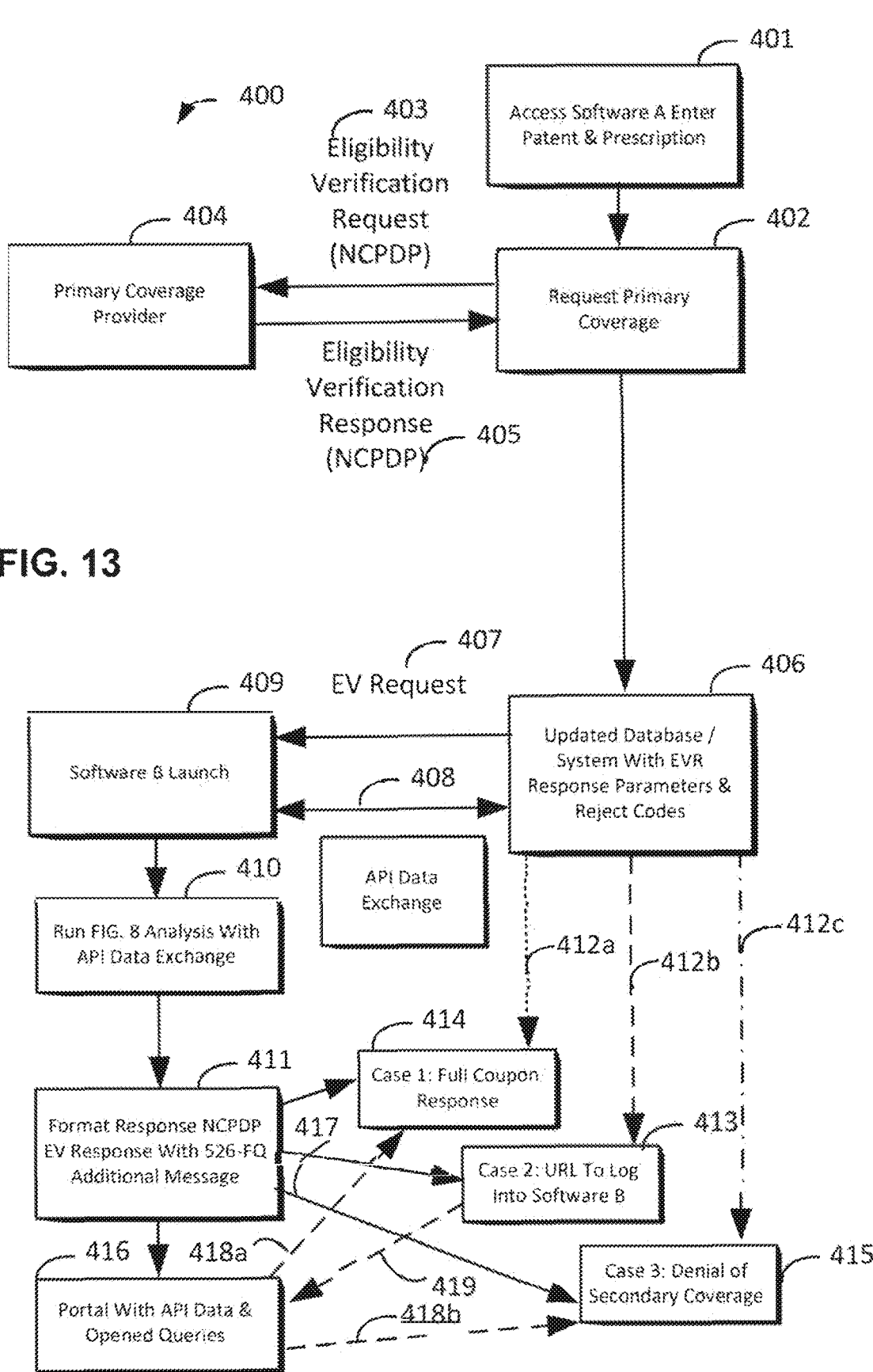
FIG. 13 is a revised version of FIG. 8 adding multiple secondary features to the disclosure in accordance to an embodiment of the present disclosure.

FIG. 13 offers greater detail on how the process generally and broadly 400 described at FIG. 11 can be articulated in conjunction with a plurality of different responses. For example, at 401 the Provider such as a doctor or pharmacist accesses Software A and enters much of the data relating to the patent and the prescription (which may have been received automatically in Software A). The Provider may then request primary coverage 402, for example a coverage of 20%, 95% or even 100% from the source shown at FIG. 5 as 110. As shown above, at multiple portion of Software A, can a message be sent of relevance, here the Eligibility Verification Request under the NCPDP code 403. The primary coverage provider (i.e. the payer) 404 responds to the eligibility verification by sending data which indicates, for example, if the primary covers all, a portion or none of the request. Codes are also sent under the format NCPDP as the EV Response 405. This response can be either automatically used to upload the information as described below or the request can be made as shown as part of a subsequent activation from the Provider.

Once the Provider, as shown at FIG. 7 has the primary result 133 displayed and for use in any way described above, she can make a request for a secondary coverage by clicking, for example on the button ADD 134 in Software A. Returning to FIG. 13, at 406, the database of Software A is now updated with the EVR data as shown at FIG. 7 133. It has now response parameters and, for example, reject codes if in fact those were generated by the Primary Insurance Provider. At this step, the database is updated with this information at Software A.

The EV Request made 407, for example via FIG. 7 element 133 is sent to the Software B 409 who is launched and using the API Data as described above 408, will exchange and upload information it needs to run as shown at 410 and fully described at FIG. 8. The system as shown at FIG. 8 then creates a formatted response under the NCPDP protocol 411 as the EV Response that will include data in the 526-FQ additional message for display back in Software A. As shown, three cases are for the moment possible and illustrated by black arrows, at Case 1, the data secured by Software B is sufficient and a full response 414 is sent for display 412*a* in Software A. In a second intermediate case, a URL is sent back that forces and demands the user of Software A to click and log into Software B to complete some level of verification. For example, in these cases 413 there could be a Provider obligation to validate one parameter as the visual contact with the person. The third case 417 is when the case for secondary coverage is denied 415. The Software A will then display 412*c* this response. The intermediate response show is indicated at 412*b* on FIG. 13.

One final step is shown as 416 where the Provider after being confronted with Case 2 where it shown in one embodiment where he must log in, clicks on the link 419 and enters the portal 416 with the API data and associated queries already loaded. The Provider will answer one or two questions, then the system will either issue the response 418*a* or deny the response 418*b*.

Figure 14:
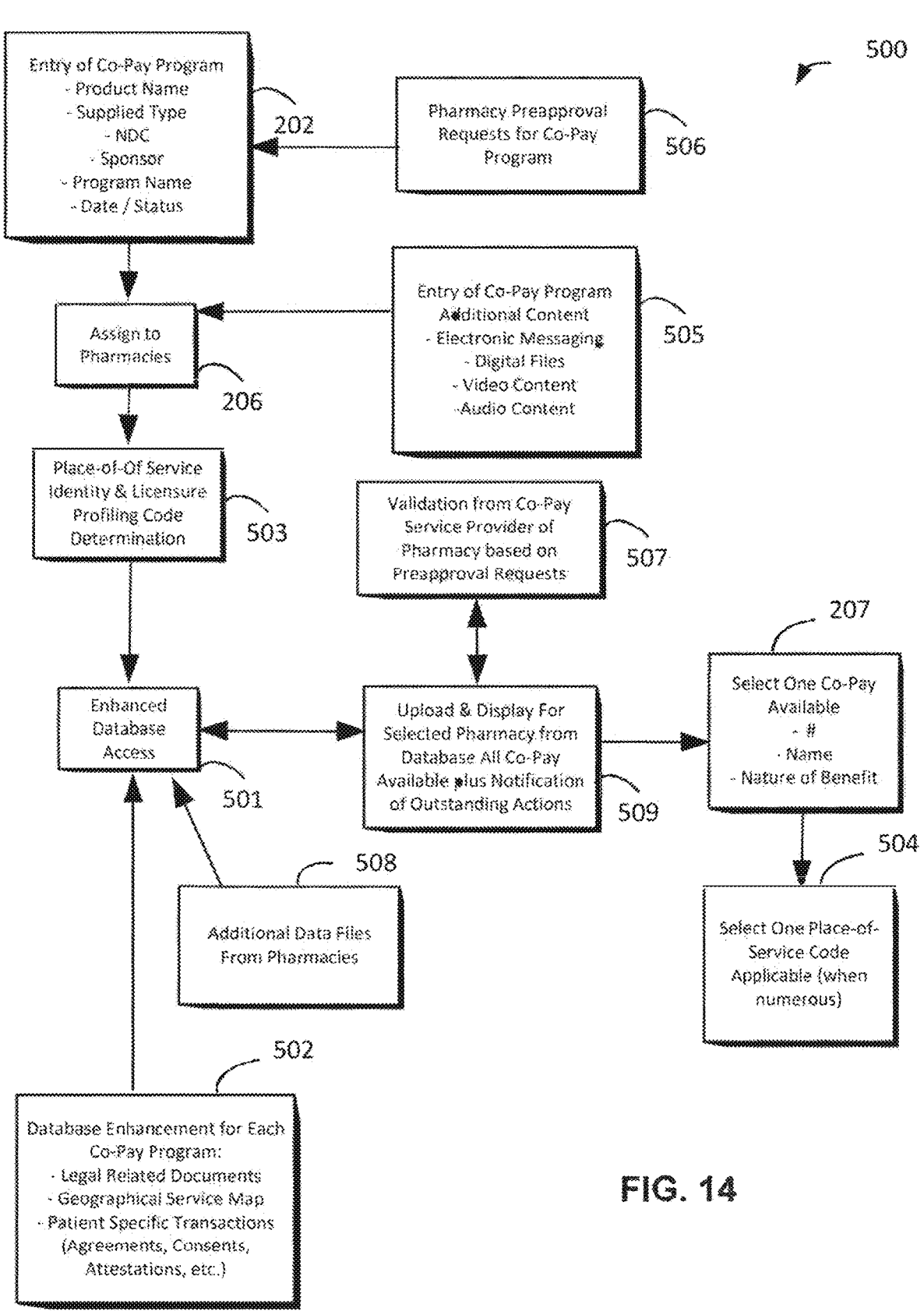
FIG. 14 is a diagram illustrating the different steps of the primary process linked with the process for the management, storage and automation of health care information and application program interface therefor according to an embodiment of the present disclosure.

Turning to FIG. 14, as shown with great detail at FIGS. 3-13 is a new process, system and method for multiple steps in optimization, database enhancement, storage, and automation of use of health care information by a health care provider and it manages multiple payer services linked with a patient or a prescription. To help understanding, FIG. 8 has been modified and some of the components, such as the assignment of pharmacies 206 and the selection of one Co-Pay 207, have been taken but has indicated and changed the different elements and pieces around it. What is described are additional pieces which should be seen as additive to FIG. 8 and not replacing these above described concepts.

For example, the improved process, system and method of use thereof 500 first results in enhancing database accesses 501 and the amount of information which is stored therein. At 502, what is shown is the enhancement of the database 501 for each of the numerous co-pay programs, for example, adding legal related documents linked with the programs, geographical service maps and other related information linked with where the services are offered, patient specific transactions such as agreements, consents, attestations, etc.

At 503, there is the place-of-service identity and licensure profiling, that offers information on where the service relates to the setting in which prescriptions pertaining to a manufacturer-sponsored service are received. For example, the Center for Medicare & Medicaid Services created a set of service codes for professional claims that includes:

| Code | Place of Service Name | Place of Service Description |
|---|---|---|
| 01 | Pharmacy | A facility or location where drugs and other medically related items and services are sold, dispensed, or otherwise provided directly to patients. |
| 02 | Telehealth | The location where health services and health related services are provided or received, through a telecommunication system. |

-continued

| Code | Place of Service Name | Place of Service Description |
|---|---|---|
| 03 | School | A facility whose primary purpose is education. |
| 04 | Homeless Shelter | A facility or location whose primary purpose is to provide temporary housing to homeless individuals. |
| 05 | Indian Health Service | A facility or location, owned and operated by the Indian Health Service |
| . . . to 99 | | |

By way of incorporation therein, the entire table from the CMS (updated October 2019) is added hereto. As illustrated such a code may be placed between element 206 and 501 or can be inserted as part of any upload and structure of information. One of ordinary skill in the art will understand that if Software A already is programmed to include this additional information, such can be uploaded as part of 202. At element 504, the code that was entered 503 can then be selected once the co-pay or the pharmacy has been entered into the system at step 509 or 207.

Next, there is added step 505 which allows for the system, process and method of use thereof to enter co-pay program additional comments that may be generated or provided by any party. For example, electronic messaging, digital files, video or audio content relating to the program. This will help a user who secures information to get additional information on the programs.

Step 506 illustrates where a pharmacy or any other user of the system can be asked to file and seek preapproval requests linked with the co-pay program. The Software B 105 can, as shown, request at 507 for validation from Co-Pay service providers of these requests 506 in a subsequent step.

At 508, there is added the additional capacity for data files of multiple format type to be loaded and added to the enhance database 501 to further help with information collection, processing and storage for future use. At 509, the upload and display for selected pharmacies from the enhanced database 501 also can include notifications of outstanding actions, for example the request for validation 506, 507 uploaded from the pharmacy.

Figure 15:
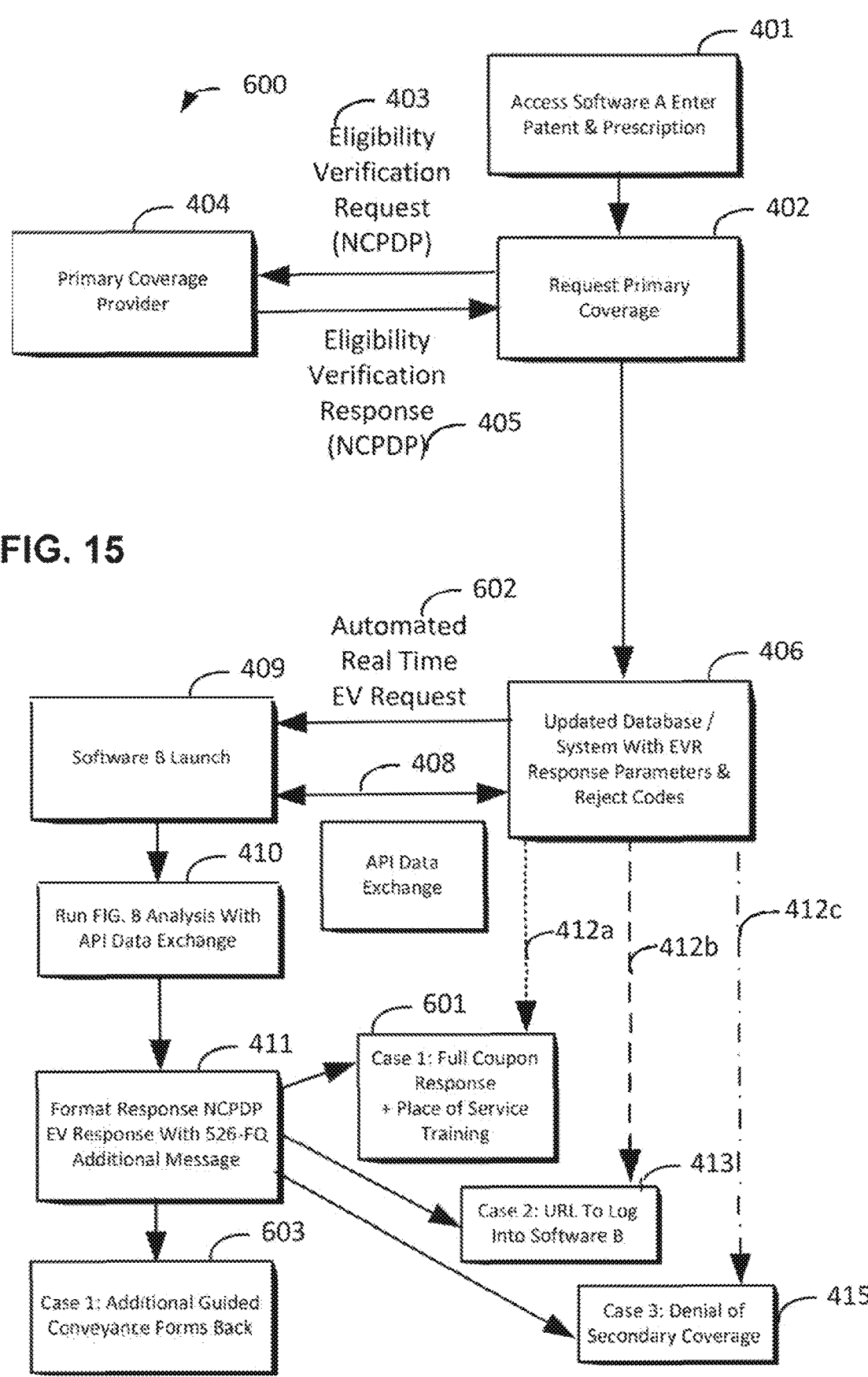
FIG. 15 is a revised version of FIG. 14 adding multiple secondary features to the disclosure in accordance to an embodiment of the present disclosure.

Finally, at FIG. 15, the added elements 600 which add to the related FIG. 13 diagram show how Case 1 which is returned as a coupon response as described above can 601 also include place of service training content. Also, as shown at 603, additional guided conveyance forms can be sent back to the Software A 107 to help the Provider. Finally, automated real time EV requests can also be used 602 instead of the selection of a button such as 133 to upload secondary services and coverage. The protocol can be designed to immediately and automatically be queried when the EV Request 403 is sent for primary coverage. Options can then be displayed.

In the above and on the associated figures, what is shown is a process for the management, storage, and automated generation over a system comprising a plurality of user personal computers or servers, each with at least a computer processor with a computer memory for executing software in the computer memory by the computer processor, a computer display and interface connected to the computer processor for use of at least a software solution by the processor in the memory, and wherein each of the plurality of user personal computers is connected to a network for the transfer of information in at least one protocol of communication between said user personal computers, wherein the system includes at least a first of the plurality of user personal computers includes a first software solution for determination of primary coverage by a payer in the health care space, and includes a second solution either on the same or a different user personal computer for determination of secondary coverage by a different payer in the health care space, the process comprising the steps of connecting, using a health-care related protocol of communication, over a network to the first software solution operable by a provider of health care services in a health care space to a third party payer for sending an eligibility verification request of primary coverage for an individual and securing a response of eligibility verification, updating a database of the first software solution with the response for primary coverage received at the first software solution, connecting, using the health care related protocol of communication, over the network to the second software solution operable by the provider of health care services in the health care space, launching the second software solution and using an API data exchange tool, populating the second software solution with a selected set of data from the database updated in one of the preceding steps, allowing the second software solution to generate a formatted response in the health care protocol of communication with data regarding a response as to secondary coverage based upon the populated selected set of data from the database and transferred over the a software application programming interface (API) data exchange, and displaying at the first software solution to the provider of health care services the response as to secondary coverage.

In other embodiments, the health care protocol of communication is the NCPDP Telecommunication Standard, the formatted response in NCPDP protocol of communication with data regarding the response to secondary coverage is sent using a Response Status Segment including the message 526-FQ field, and the response as to secondary coverage is sent along one of three possible formatting from a group including: a full response with personalized code, a Uniform Resource Locator (URL) for logging back into the second software solution, or a denial of secondary coverage.

Also, the process further comprises the step of allowing access from the first software solution to the second software solution via the provider URL for generating over a response of opened queries either a full response with personalized code or a denial of coverage, the selected set of data from the database includes at least one of: a Bank Identification Number (BIN), a Process Control Number (CPN), a Primary Group ID, a National Provider Identifier (NPI), a selected co-pay, a patient contact information, an identification of a selected pharmacy, and using the selected set of data, the step of allowing the second software solution to generate the formatted response in NCPDP protocol of communication with data regarding the response as to secondary coverage comprises the sub-steps of selecting a health care provider, selecting a co-pay as secondary insurance, passing a patient qualification step, entry of prescriber information; population of the Bank Identification Number (BIN), the Process Control Number (PCN) and the Primary Group ID, entering a primary claim result; and generating the response as to secondary coverage.

Also, the response is a coupon with at least a member ID personalized number for entry into the first software solution, the process of entering the primary claim results includes entry of rejection codes also part of the selected set of data, the provider of health care services is a pharmacy, the primary coverage and the secondary coverage is for the repayment of costs of dugs, and the API is of the JSON type with JSON fields and wherein the API is programmed to both capture and transfer data from the first software solution to the second software solution but also to transfer a response from the second software solution to the first software solution.

Also described is a system for the management, storage, and automated generation of primary and secondary health care coverage, comprising: a plurality of user personal computers or servers, each with at least a computer processor with a computer memory for executing software in the computer memory by the computer processor, a computer display and interface connected to the computer processor for use of at least a software solution by the processor in the memory, and wherein each of the plurality of user personal computers is connected to a network for the transfer of information in at least one health care protocol of communication between said user personal computers, wherein the system further comprises: at least a first of the plurality of user personal computers with a first software solution for determination of primary coverage by a payer in the health care space, and at least a second of the plurality of user personal computers with a second solution either on the same or a different user personal computer for determination of secondary coverage by a different payer in the health care space, and wherein, the first software solution for sending an eligibility verification request of primary coverage for an individual to the second software solution and securing a response of eligibility verification in a health care protocol; a database in the first software solution for storage of the response for primary coverage received at the first software from the second software solution; an API data exchange tool, for taking a selected set of data from the database of the first software solution and populating the second software solution; and the second software solution to generate a formatted response in the health care protocol of communication with data regarding a response as to secondary coverage based upon the populated selected set of data from the database and transferred over the API data exchange.

Finally, also disclosed is an Application Program Interface (API) to help coordinate the transfer of information in a system for the management, storage, and automated generation of primary and secondary health care coverage, the system comprising a plurality of user personal computers or servers, each with at least a computer processor with a computer memory for executing software in the computer memory by the computer processor, a computer display and interface connected to the computer processor for use of at least a software solution by the processor in the memory, and wherein each of the plurality of user personal computers is connected to a network for the transfer of information in at least one health care protocol of communication between said user personal computers, wherein the system further comprises at least a first of the plurality of user personal computers with a first software solution for determination of primary coverage by a payer in the health care space, and at least a second of the plurality of user personal computers with a second solution either on the same or a different user personal computer for determination of secondary coverage by a different payer in the health care space, and wherein the first software solution for sending an eligibility verification request of primary coverage for an individual to the second software solution and securing a response of eligibility verification in a health care protocol, the API comprising, a data exchange tool, for taking a selected set of data from a database of the first software solution and populating the second software solution, and the second software solution to generate a formatted response in the health care protocol of communication with data regarding a response as to secondary coverage based upon the populated selected set of data from the database and a tool to transfer back to the first software solution a response data.

What is claimed is:

1. A method, comprising:

serving, by a server, a web page generated based on a set of data, wherein the web page is served based on a rules engine:

receiving a request associated with a profile from a switch through an Application Programming Interface (API) after the switch receives the request from a first application program hosted on a computing terminal, wherein the computing terminal hosts a second application program, wherein the first application program is a pharmacy management program, wherein the second application program is a browser program;

generating a response to the request such that the response contains a field populated with a tokenized Uniform Resource Locator (URL) unique to the request; and sending the response through the API to the switch such that the switch sends the response to the first application program and the tokenized URL is activatable at the first application program to be opened by the second application program without any other login credentials to the rules engine to cause the rules engine to retrieve the set of data which is specific to the request, wherein the web page is served to the second application program such that the web page is displayed by the second application program, wherein the API converts the request between a National Council for Prescription Drug Programs (NCPDP) format and a structured format when the request is sent from the switch to the rules engine through the API and the response is sent from the rules engine to the switch through the API, wherein the API receives the request from the switch in the NCPDP format, wherein the rules engine receives the request from the API in the structured format, wherein the API receives the response from the rules engine in the structured format, wherein the switch receives the response from the API in the NCPDP format.

2. The method of claim 1, wherein the computing terminal is a first computing terminal, and further comprising:

enabling a second computing terminal hosting a third application program to activate the tokenized URL sourced from the response.

3. The method of claim 2, wherein the first computing terminal is collocated with the second computing terminal.

4. The method of claim 2, wherein the first computing terminal is not collocated with the second computing terminal.

5. The method of claim 1, wherein the field is an Additional Message Information (AMI) field.

6. The method of claim 5, wherein the AMI field is a 526-FQ field.

7. The method of claim 1, wherein the web page is programmed to receive a user input from the second application program, wherein the user input enables a level of verification for the request via the rules engine.

8. The method of claim 7, wherein the level of verification involves validating a parameter associated with the request and the profile.

9. The method of claim 7, wherein the level of verification involves inputting a set of alphanumerics associated with the request and the profile.

10. The method of claim 7, wherein the level of verification involves inputting an attestation associated with the request and the profile.

11. The method of claim 1, wherein the web page contains an entry form programmed for inputting a set of information associated with the request, wherein the rules engine enables the tokenized URL to be a one-time use link to the entry form, wherein the tokenized URL is active for a limited period of time.

12. A method, comprising:

hosting, by a first server, a rules engine programmed to enable:

a first computing terminal hosting a first application program, a second computing terminal hosting a second application program in communication with the first application program, a second server, an Application Programming Interface (API), and a switch to operate such that the switch sends a request associated with a profile to the rules engine after the switch receives the request from the first application program such that (i) the rules engine generates a response to the request where the response contains a field populated with a tokenized Uniform Resource Locator (URL) unique to the request, (ii) the rules engine sends the response to the switch, and (iii) the switch sends the response to the first application program such that the tokenized URL is activatable at the second application program to be opened by the second application program without any other login credentials to the rules engine to cause the rules engine to retrieve a set of data specific to the request and enable the second server to serve a web page generated based on the set of data to the second application program such that the web page is displayed by the second application program, wherein the first application program is a pharmacy management program, wherein the second application program is a browser program, wherein the API converts the request between a National Council for Prescription Drug Programs (NCPDP) format and a structured format when the request is sent from the switch to the rules engine through the API and the response is sent from the rules engine to the switch through the API, wherein the API receives the request from the switch in the NCPDP format, wherein the rules engine receives the request from the API in the structured format, wherein the API receives the response from the rules engine in the structured format, wherein the switch receives the response from the API in the NCPDP format.

13. The method of claim 12, wherein the field is an Additional Message Information (AMI) field.

14. The method of claim 13, wherein the AMI field is a 526-FQ field.

15. The method of claim 12, wherein the web page contains an entry form programmed for inputting a set of information associated with the request, wherein the rules engine enables the tokenized URL to be a one-time use link to the entry form, wherein the tokenized URL is active for a limited period of time.

16. The method of claim 12, wherein the web page is programmed to receive a user input from the second application program, wherein the user input enables a level of verification for the request via the rules engine.

17. The method of claim 16, wherein the level of verification involves validating a parameter associated with the request and the profile.

18. The method of claim 16, wherein the level of verification involves inputting a set of alphanumerics associated with the request and the profile.

19. The method of claim 16, wherein the level of verification involves inputting an attestation associated with the request and the profile.

20. The method of claim 12, wherein the first computing terminal and the second computing terminal are collocated with each other.

\* \* \* \* \*